Figure 1:
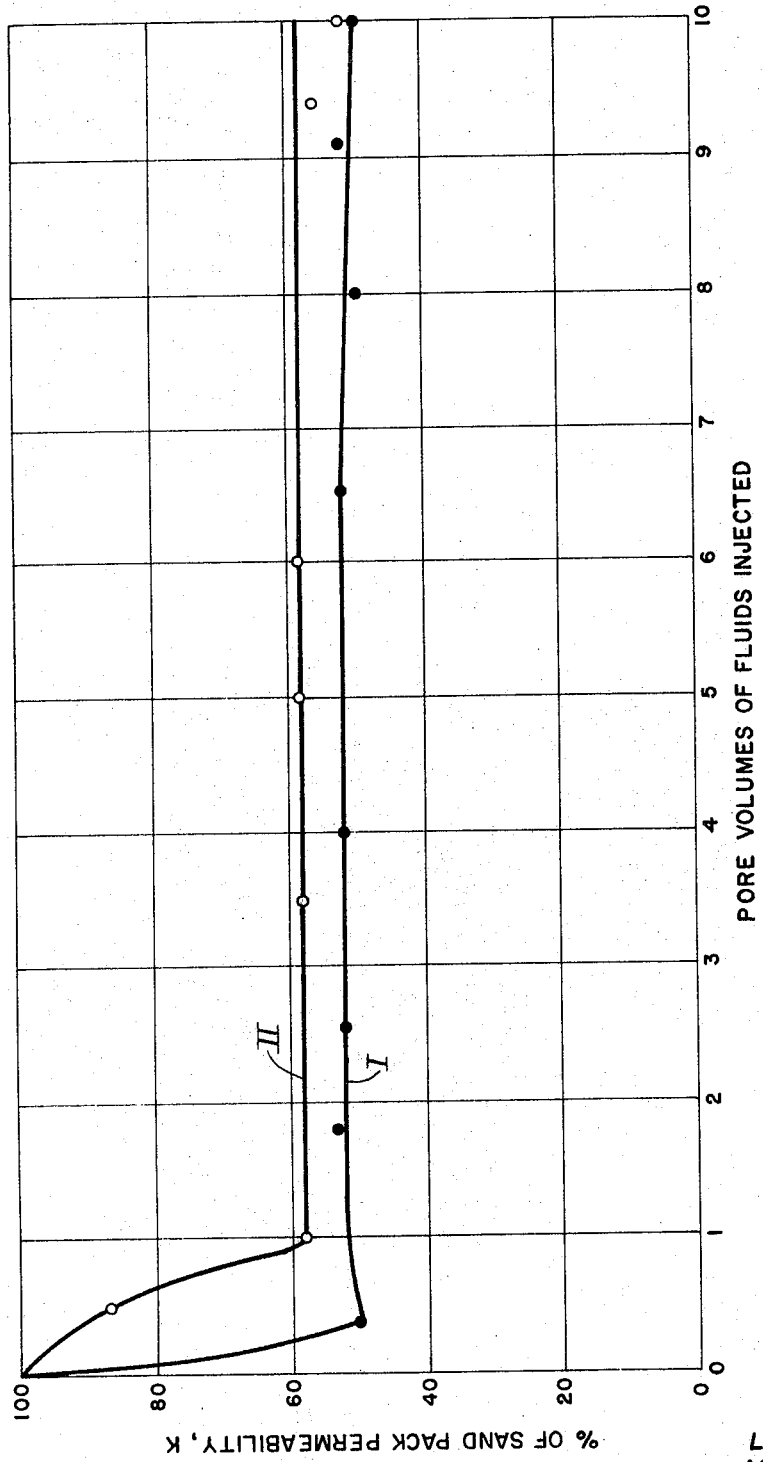

Aug. 15, 1967  L. J. O'BRIEN ET AL  3,335,792
METHOD FOR INCREASING OIL RECOVERY
Filed Dec. 18, 1964  3 Sheets-Sheet 1

INVENTORS.
LEO J. O'BRIEN
ALLYN T. SAYRE
BY
ATTORNEY

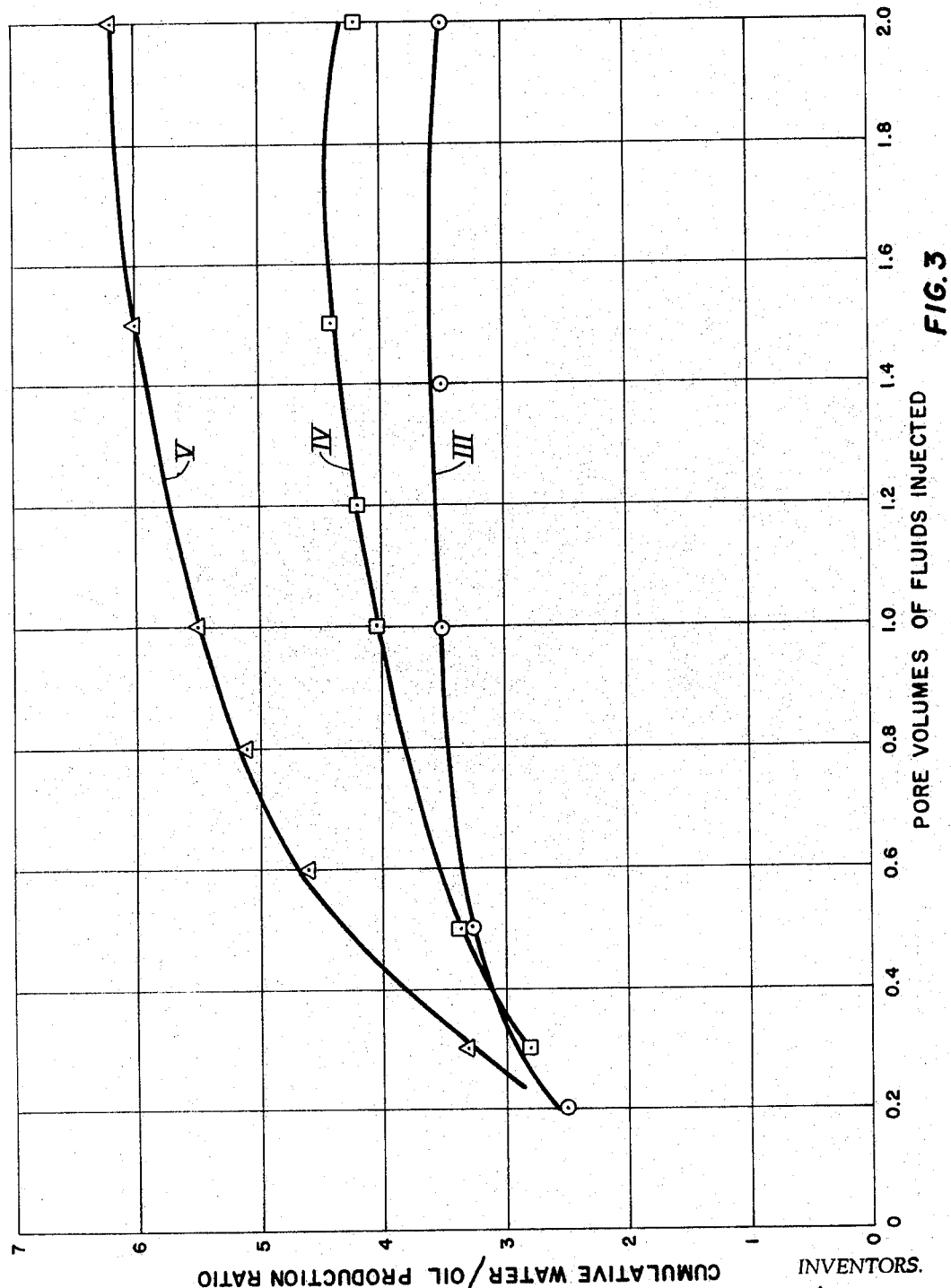

United States Patent Office 3,335,792
Patented Aug. 15, 1967

3,335,792
METHOD FOR INCREASING OIL RECOVERY
Leo J. O'Brien, Crystal Lake, Ill., and Allyn T. Sayre, Denver, Colo., assignors, by mesne assignments, to Union Oil Company of California, Los Angeles, Calif., a corporation of California
Filed Dec. 18, 1964, Ser. No. 419,432
15 Claims. (Cl. 166—9)

This invention relates to methods of treating subterranean oil-bearing formations whereby preliminary operations prior to conducting ultimate recovery and/or the recovery of the oil are greatly facilitated. More specifically this invention pertains to methods of reducing formation permeability, methods of fracturing, acidizing and producing petroleum-bearing reservoirs and formations. Even more specifically the embodiments of this invention revolve around the use of surfactants in a novel manner whereby the hereinafter enumerated objects are readily obtained.

The use in oil recovery of surfactants, having foam-producing characteristics, in conjunction with gasiform driving fluids was ostensibly initially advanced by D. C. Bond and O. C. Holbrook in U.S. Patent 2,866,507. Efficiency of the gas drive was found to be greatly enhanced by the presence of foam at the drive gas-oil interface which inherently prohibited extensive fingering and channeling of the gas through the formation fluids. Thus, this successful use of foam, though limited to gas drive processes, provided the necessary impetus for further investigations.

The further investigations and experiments of A. N. Fried, published in Bureau of Mines Report of Investigations 5866 (The Foam-Drive Process for Increasing Recovery of Oil, 1961), stimulated the industry's imagination as respects the application of surfactants in secondary and tertiary methods of oil recovery using other than gasiform driving fluids. While the increased oil recoveries through the use of surfactants in waterflooding operations had been experimentally attested to in the laboratory, the art was not cognizant of the still greater recoveries that could be obtained when using surfactants in a different physical state, i.e., a foam. Thus Bond, Holbrook and Fried made available an entirely new vista for man's insatiable quest for more efficient methods of extracting petroleum from the bosom of the earth.

Fried, however, emphasized the use of foam as an oil-displacement entity per se or with a gas drive rather than its use in bank form in conjunction with an aqueous driving fluid. In fact Fried concluded that a foam followed by an aqueous driving fluid did not effect additional oil recovery. In addition, while the permeability reducing characteristics of foam were recognized, the application of this knowledge remained for other workers in the art.

It has now been discovered that a foam bank generated in situ followed by a dilute surfactant solution, prior to the subsequent injection of an aqueous driving fluid, greatly reduces the permeability of a subterranean oil-bearing formation. Thus, depending upon the ultimate goal, these steps form the prerequisite of either one of permeability reducing treatment, fracturing, acidizing or oil recovery method. The application of the requisite steps however, will find its greatest use in the secondary or tertiary recovery of oil. Generally, therefore, this embodiment consists in generating an in situ foam bank in a petroleum-bearing formation or reservoir, injecting a dilute surfactant solution in an amount sufficient to form a buffer zone between the foam bank and subsequently injected driving fluid whereby the foam bank is not adversely affected and its integrity maintained and thereafter injecting an aqueous driving fluid to drive at least a major portion of the foam bank through the formation or reservoir to a production well.

It is an object of this invention to provide a method of reducing subterranean formation permeability.

It is another object of this invention to provide a method of producing petroleum from subterranean reservoirs and formations wherein the efficiency of an aqueous fluid drive is greatly enhanced.

It is a further object of this invention to provide a method of utilizing surfactants, surface-active agents and foam producing agents in a manner whereby oil recovery, fracturing and acidizing methods are greatly improved.

A further object of this invention is to provide a method of augmenting and maintaining a foam bank in a subterranean formation wherein the foam bank is driven through the formation by an aqueous fluid drive.

Figure 2:
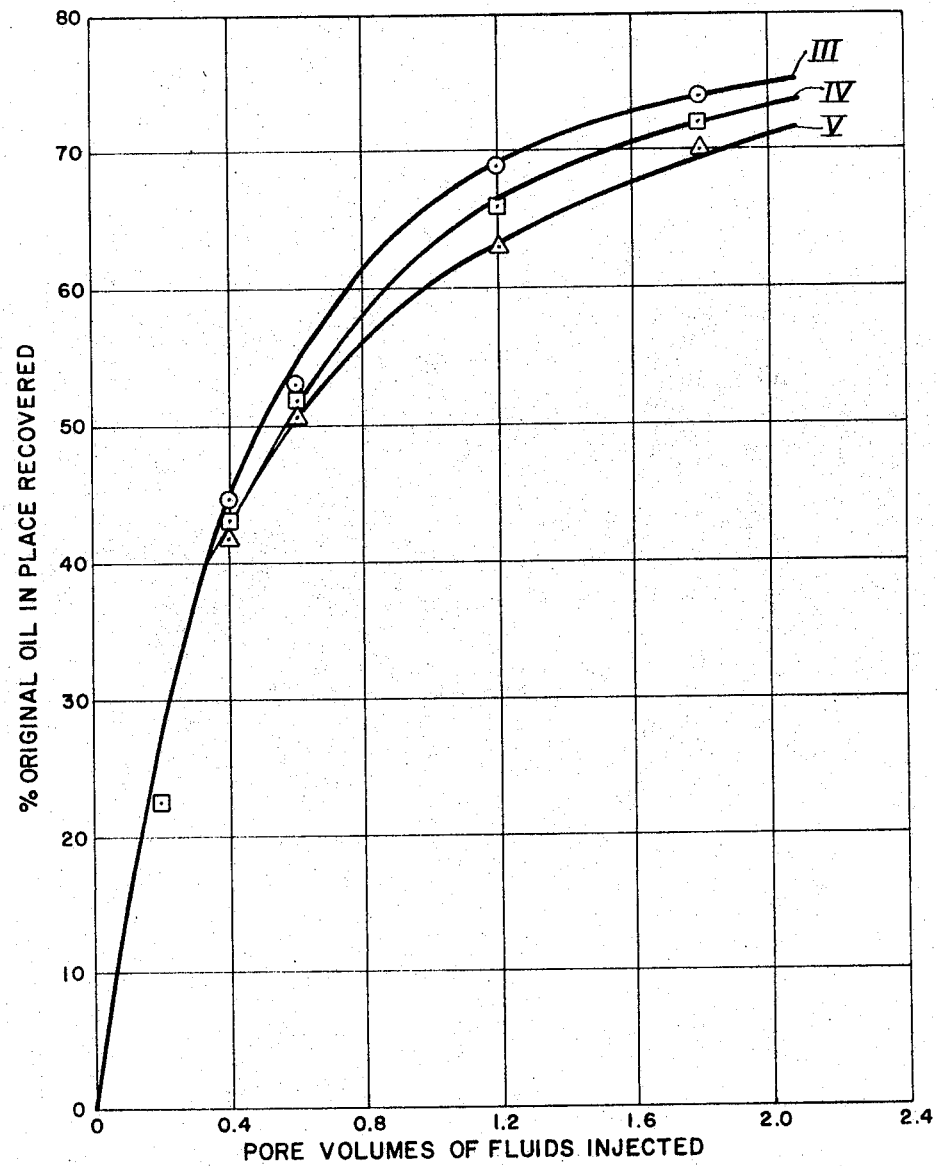

These and other objects will become apparent from the following detailed description of the invention taken in conjunction with the drawings wherein:

FIGURE 1 depicts graphically the experimental data obtained to show the permeability reduction of a formation according to one embodiment of the invention;

FIGURE 2 graphically illustrates the data obtained in facsimile oil recovery experiments showing the increased oil recovery attained according to one embodiment of the invention over prior art methods of recovery; and FIGURE 3 illustrates data experimentally obtained showing increased oil recovery, at low water content, according to the secondary oil recovery embodiment of the disclosed invention.

Referring specifically to FIGURE 1, Curve I illustrates the permeability of a core to water when practicing one embodiment of this invention. Curve II indicates the increased permeability of the same core when using a prior art method. The data, from which the graphs were constructed, were obtained in laboratory experiments. A cylinder 2 feet in length was filled with No. 16 sand. The sand pack was saturated with crude oil and driven to a residual oil saturation using a brine having a sodium chloride content of 1.5%. The permeability, K, of the sand pack to water was found to be 2,000 millidarcies. The first experiment consisted in injecting into one end of the pack, in sequential order, 0.10 pore volume of an aqueous solution containing 0.1% of "O K Liquid," a commercially available surfactant, marketed by Procter & Gamble Co. and disclosed in U.S. Patent 2,941,950; sufficient air to saturate the sand pack to a 50% level, thus insuring substantially complete foaming of the surfactant; and brine containing 1.5% NaCl. Curve II depicts the data obtained wherein total pore volumes of fluids injected and percent of the permeability, K, of the sand pack are represented along the abscissa and ordinate axes respectively. Curve I was obtained using the same procedure as above except 0.10 pore volume of a dilute surfactant solution, containing 0.1% by weight of the identical surfactant initially injected, was injected intermediate the air and brine. It is readily apparent that the utilization of one of the embodiments of this invention significantly reduces permeability over a prior art method thus pointing up the applicability of the invention to acidizing, fracturing and permeability reduction processes.

FIGURES 2 and 3 graphically represent data obtained in three additional experiments. A dual sand pack having equal volume parallel conduits with a common outlet with a 100–150 mesh sand in one conduit, having a permeability to water of 7930 millidarcies, and a random size sand in the other conduit with a permeability to water of 2840 millidarcies, were saturated with 88.8% pore volume of crude oil and 11.2% pore volume of 1.5 wt. percent NaCl brine prior to each experiment. All experiments were conducted at room temperature (75° F.) and at an inlet pressure of 15 p.s.i.g. The abscissa of both FIGURES 2 and 3 represents pore volumes of fluid injected while the ordinate represents cumulative oil produced based on the percentage of original oil in place and the cumulative water/oil ratio respectively.

Curve V represents a prior art waterflood while Curve IV represents a prior art foam flood. Curve III represents a foam secondary recovery method in accordance with this invention. The following examples will illustrate in detail the procedure of each of the secondary recoveries wherein a foam bank was utilized.

*Example I*

Into the common inlet of the dual sand pack were injected 20% pore volume of an aqueous solution containing 1% by weight of "O K Liquid"; nitrogen; and water until the total cumulative amount of fluids injected comprised 2 pore volumes. The data obtained is accurately set forth as Curve IV in FIGURES 2 and 3.

*Example II*

Into the common inlet of the dual sand pack were injected 15% pore volume of an aqueous solution containing 1% by weight of "O K Liquid"; nitrogen; 10% pore volume of an aqueous solution containing 0.5% by weight of "O K Liquid"; and water until the total cumulative amount of fluids injected totaled 2 pore volumes. The data obtained is graphically depicted as Curves III in FIGURES 2 and 3.

It is readily apparent that the embodiment of the invention, as set forth in Example II, yielded greater oil recovery at low water:oil ratios.

In accordance with the present invention a surfactant, foaming agent or surface-active agent having foam producing characteristics is injected into an injection well of a subterranean formation either per se if its form permits or in a vehicle in which the foam producing agent is miscible. Inasmuch as the instant invention contemplates an aqueous driving fluid, best results will be obtained where each of the injected fluids are miscible with each other. Thus, an aqueous vehicle and a water soluble surfactant or surface-active agent is preferred. Thereafter a sufficient amount of gas such as air or nitrogen is injected to substantially completely foam the surfactant or surface-active agent thereby forming an in situ foam bank within the formation. Thereafter a dilute surfactant or surface-active agent-containing solution, preferably aqueous in form, is injected in sufficient quantity to produce an effective buffer zone between the foam bank and subsequently injected fluids which fluids will generally be aqueous in form, in an amount which will vary with the particular application of the disclosed embodiment of the invention. For instance, if a secondary recovery operation is to be conducted upon the formation, a sufficient amount of driving fluid will be injected to drive at least a major portion of the generated foam bank through the formation to a production well or wells whereby fluids are produced from the production well or wells until further production becomes economically unattractive. In other embodiments, i.e., acidizing, fracturing, permeability reduction, only that amount of aqueous driving fluid will be injected into the injection well and thusly into the formation which will be sufficient to contact that area of the formation surrounding the injection well upon which it is desired to reduce the permeability, acidize or fracture.

It is believed that the improved results obtained in accordance with the various embodiments of this invention arise in several manners. Ostensibly the injection of the surfactant or surface-active agent transforms the formation or reservoir from a water wet to an oil wet state and thusly facilitates the removal of petroleum oil contained within the interstices of the formation. In addition, the generation of a foam in situ tends to plug large interstices of the formation thereby redirecting or channeling subsequently injected fluids into the smaller interstices of the formation. The injection of a dilute surfactant or surface-active agent containing solution after the formation of the foam bank prohibits subsequently injected aqueous driving fluid from contacting and breaking down the generated foam. Also the surface-active agent contained in the dilute aqueous slug will tend to augment and replenish the generated foam bank as the foam bank moves through a portion of the formation. Those in the art will readily appreciate that the herein disclosed method of reducing formation permeability will not only have a beneficial effect on secondary and tertiary oil recovery but will also act to provide the requisite steps of a fracturing or acidizing operation. For instance, a combination of the generated in situ foam and dilute aqueous surfactant slug will prohibit loss of the subsequently injected acidizing fluid or subsequently injected fracturing fluid.

Surface-active agents and foam producing agents will hereinafter be referred to in the specification and appended claims as a "surfactant." The surfactant preferably should be one capable of forming a stable foam under formation or reservoir conditions when it is intimately contacted with a liquid and a gas. The surfactants may be either anionic, cationic or nonionic so long as they meet the basic prerequisites stated above and may be readily selected from commercially published lists which describe their properties. Information concerning such surfactants may be found in Encyclopedia of Surface-Active Agents, by J. P. Sisley, translated from the French by P. J. Wood, Chemical Publishing Co., New York, 1952. If appropriate, the surfactant may be injected into the formation alone where sufficient connate water is present or it may be incorporated in an aqueous liquid vehicle. The use of a vehicle will act to more readily disperse the surfactant within the interstices of the formation. An alternative, though not preferred, is the instance where foam is generated on the surface and thereafter injected into the subterranean formation. Utilizing this method as opposed to the in situ generation of foam within the formation will prove to necessitate higher injection pressures and create other detrimental effects which practical field experience teaches should be avoided.

An example of a water-soluble surfactant is polyoxyethylated octylphenol known commercially under the trade name "Triton X–100." Other examples of suitable foam producing agents include dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$—$C_6$ sulfo dicarboxylic acids having the general formula

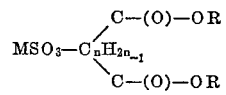

wherein M is a substituent forming a water-soluble salt, such as alkali metals, ammonium, and substituted ammonium, R is $C_3$—$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate, and others; and water-soluble perfluoroalkanoic acids and salts having 3–24 carbon atoms per molecule, e.g., perfluorooctanoic acid, perfluoropropanoic acid and perfluorononanoic acid.

Other surfactive agents which may be used in the practice of this invention are:

| Trade name | Chemical name |
|---|---|
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM concentrate | Ethylene cyclomido 1 - lauryl, 2 - hydroxy ethylene NA alcoholate, methylene Na carboxylate. |
| Miranol MM concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfanole FAF | Sodium salt of fatty alcohols, sulfated. |
| Triton AS-30 | Sodium lauryl sulfate. |
| Triton X-100 | Alkyl aryl polyether alcohol. |
| Span 20 | Sorbitan monolaurate. |
| Span 40 | Sorbitan monopalmitate. |
| Span 85 | Sorbitan trioleate. |
| Tween 65 | Polyoxyethylene sorbitan tristearate. |
| Tween 81 | Polyoxyethylene sorbitan monooleate. |
| OPE 1 | Octylphenoxyethanols. |
| OPE 2 | Octylphenoxyethanols. |
| OPE 3 | Octylphenoxyethanols. |
| Triton GR-7 | Dioctyl sodium sulfosuccinate. |
| Triton B-1956 | Modified phthalic glycerol alkyl resin. |
| Triton X-45 | Isoctyl phenyl polyethoxy ethanol (about 5 ethoxy groups per molecule). |

While the surfactants utilized in accordance with the invention may be injected into the formation in and of themselves, it is preferred that they be incorporated in aqueous solutions. Therefore, it should be understood that many surfactants which are primarily oil-soluble, nevertheless have sufficient water solubility to permit their use in aqueous solutions and have the ability to form tenacious foams under reservoir temperatures and pressures.

Preferably the surfactants utilized in this invention are those which form a stable foam in the presence of crude oil; in reservoirs where the interstitial water contains a high concentration of salt, a surfactant is used which foams readily in the presence of oil and brine.

The concentration of surfactant in the aqueous solution employed in accordance with the invention will depend in large part on the particular agent utilized and the type of formation which is to be produced. For instance, where a particular type of formation creates a condition under which much of the surfactant is adsorbed or absorbed in the interstices of the formation it will be necessary to employ a greater amount of surfactant so that a sufficient amount will remain to form a foam bank within the reservoir upon the subsequent injection of a gas. Surfactant concentrations between about 0.01 to 10 weight percent of the solution in which they are incorporated are generally suitable for purposes of the invention with the preferable concentration being about 0.1 to 1.0 weight percent.

The quantity of surfactant vehicle or carrier will depend largely upon such well recognized factors as the recovery pattern, the spacing between wells, the porosity of the formation, and the thickness of the formation. Ideally the quantity of vehicle or carrier employed should be such that a sufficient amount of liquid is available to completely foam the surfactant solution upon the intimate contact of the solution with a gas. Since the amount of solution required to accomplish this cannot be precisely determined in advance, the most convenient method of expressing the quantity of surfactant solution to be used is in terms of reservoir pore volume. In general from about 0.01 to 0.3 pore volume of solution will be utilized with the preferred range being about 0.05 to 0.10 pore volume. Quantities in the upper part of this range may be required for operations in which relatively dilute solutions are employed or in which surfactants having an affinity to absorb upon the rock to a high degree are used. Lesser quantities may be utilized where the surfactant employed is a highly effective one and where the concentration of the solution is high.

The dilute sufactant containing solution will normally be an aqueous one such as water or brine and is preferably nongaseous so as to inhibit the formation or generation of a foam distant from the main foam bank. The quantity of liquid will be an amount sufficient to form a buffer zone between the formed foam bank and subsequent aqueous driving fluid so that the subsequently injected driving fluid will not tend to break down the generated foam bank. The quantity of dilute surfactant solution will generally lie in the range of about 0.01 to 0.3 pore volume with a preferred practical range of about 0.05 to 0.10 pore volume being sufficient under most conditions. The concentration of the surfactant in this dilute solution will normally range between 0.01 to 1.0 weight percent and preferably will be about 0.5 weight percent. While it is desirable that all foam generated in situ will form part of a band or bank at the residual oil/driving fluid interface it is to be understood that in some instances all of the surfactant will not be effectively displaced from the injection well area. Under these conditions the generation of a small amount of foam will not adversely affect the overall process to an appreciable extent.

In carrying out the process of the invention, the surfactant or surfactant solution is first injected into the reservoir or formation through one or more injection wells arranged in a logically spaced pattern. Five spot, seven spot, or other conventional well patterns may be utilized and generally are preferable. After a sufficient amount of surfactant to effect the formation of a tenacious foam bank within the formation has been introduced, a quantity of a gas sufficient in size to substantially completely foam the introduced surfactant is then injected into the injection well and under normal circumstances this amount will range from about 0.10 to 0.5 pore volume, measured at 1 atmosphere and 60° F., with 0.3 pore volume (measured at the same conditions being), ample under most circumstances. Thereafter the dilute surfactant solution is injected after the formation of the foam bank in a quantity sufficient to prevent the subsequently injected aqueous driving fluid from breaking down the foam bank. Thereafter an aqueous driving fluid such as brine or water is injected to propel the foam bank through that portion of the formation which is to be treated. If the reservoir is to be produced, a sufficient amount of aqueous driving fluid will be utilized to drive at least a major portion of the foam bank through the reservoir to the production well or wells. Where it is desired to acidize or fracture the formation preliminary to conducting secondary operations in the reservoir, only that quantity of aqueous driving fluid need be injected so as to have the foam and dilute surfactant solution contact that portion of the formation to be treated. In an acidizing operation the acidizing fluid such as sulfuric, hydrochloric, etc. may be injected immediately after the aqueous driving fluid thus preventing loss of the acidic fluid to a large portion of the formation surrounding the well bore area because of high permeability. Where fracturing is desired the subsequent portions of aqueous drive fluid may be injected in quantities and under pressures sufficient to permit fracturing of the formation.

As a specific example of one embodiment of the invention, an oil-bearing subterranean reservoir has drilled therethrough a plurality of wells conforming to the conventional five spot pattern. Through the center or injection well there is injected 0.05 pore volume of an aqueous solution containing 0.1% by weight of "O K Liquid" under a pressure of 200 p.s.i. Thereafter 0.3 pore volume of air is injected at a pressure of 200 p.s.i. to cause substantially complete foaming of the surfactant containing solution. Thereafter 0.05 pore volume of an aqueous solution containing 0.05% by weight of "Triton X–100" is injected at a pressure of 350 p.s.i. followed by brine injection at a pressure of about 350 p.s.i. to move the generated in situ foam bank through the reservoir to the production wells. Production of fluids from the production wells is carried on until the oil ratio from the produced fluids becomes economically unattractive at which time brine injection into the injection well and fluid production from the production wells are terminated.

Merely to make a full and complete disclosure, it is to be understood that when used herein "O K Liquid" is taken to mean a surfactant consisting of the mixture of (a) 25–40% of the sulfated and neutralized reaction product obtained from condensing 1 to 5 moles of ethylene oxide and 1 mole of monohydric alcohol of from 10–16 carbon atoms in the molecule; (b) 6–12% of an organic builder substance consisting essentially of alkylol amide of saturated fatty acids having 10, 12 and 14 carbon atoms and an alkylol amine, said alkylol amide having not more than 3 carbon atoms in each alkylol radical; (c) 15–25% of alcohol from the group consisting of ethanol, normal propanol and isopropanol; (d) not over 5% of extraneous substances (such as sulfates and chlorides of the ammonia or substituted ammonia used, plus unsulfated alkyl ethers and other reaction products); and (e) water to make 100%.

The embodiments of this invention in which an exclusive property or privilege is claimed are defined as follows:

1. In the recovery of petroleum from a subterranean formation penetrated by an injection well and a production well wherein a foam bank is driven through the formation by an aqueous driving fluid, the improvement which comprises injecting into said formation through said injection well a substantially non-gaseous dilute surfactant solution immediately after the foam bank and prior to the injection of the driving fluid, said surfactant solution being sufficient in quantity to form a buffer zone between said foam bank and said driving fluid whereby said foam bank substantially maintains its integrity and thereafter recovering petroleum from said production well.

2. The method in accordance with claim 1 wherein said non-gaseous dilute surfactant solution is an aqueous solution of about 0.01 to 0.30 pore volume and the surfactant comprises about 0.01 to 10 weight percent of said solution.

3. The method of recovering petroleum from a subterranean formation penetrated by an injection well and a production well comprising the steps of injecting into said injection well in sequential order:
  (a) a first surfactant capable of forming foam under formation conditions when intimately contacted with a liquid and a gas, in an amount sufficient to produce a foam bank at the residual oil and subsequently injected liquid interface,
  (b) an effective quantity of gas to cause substantially complete foaming of said first surfactant,
  (c) a sufficient quantity of a dilute aqueous solution of a second surfactant to form an effective buffer zone between the foam bank and the subsequently injected aqueous driving fluid hereinafter defined,
  (d) a sufficient amount of aqueous driving fluid to drive at least a major portion of the foam bank through said formation to said production well,
and thereafter recovering fluids from said production well until further production becomes uneconomical.

4. The method in accordance with claim 3 wherein said first surfactant is water soluble and is incorporated in 0.01 to 0.30 pore volume of an aqueous liquid in the amount of about 0.01 to 10 weight percent.

5. The method in accordance with claim 3 wherein 0.10 to 0.5 pore volume of gas is injected after said first surfactant.

6. The method in accordance with claim 3 wherein said dilute solution of said second surfactant comprises about 0.01 to 0.30 pore volume and the surfactant contained therein is about 0.01 to 1.0 weight percent.

7. The method in accordance with claim 3 wherein said gas is air and said aqueous driving fluid is water.

8. The method defined in claim 3 wherein said first surfactant and said second surfactant are the same surfactant material.

9. The method of treating a subterranean formation to reduce the permeability thereof which comprises the steps of drilling a well bore to the depth of the formation to be treated; injecting into said well bore and into said formation a first surfactant capable of forming foam under formation conditions when intimately contacted with a liquid and a gas; thereafter injecting a sufficient amount of gas to substantially completely foam said surfactant; immediately thereafter injecting a dilute aqueous solution of a second surfactant in an amount sufficient to form a buffer zone between the foam and a subsequently injected aqueous driving fluid; and injecting a driving fluid immediately following said dilute surfactant solution in an amount sufficient to drive said foam and said dilute surfactant solution through that portion of the formation to be treated.

10. The method in accordance with claim 9 wherein said first surfactant is incorporated in an aqueous solution of about 0.01 to 0.30 pore volume and comprises about 0.01 to 10 weight percent of said solution.

11. The method in accordance with claim 9 wherein said dilute solution of said second surfactant comprises about 0.01 to 0.30 pore volume and the surfactant comprises about 0.01 to 1.0 weight percent of said solution.

12. The method in accordance with claim 9 wherein said gas is air and said aqueous driving fluid is water.

13. The method defined in claim 9 wherein said first surfactant and said second surfactant are the same surfactant material.

14. The method of fracturing a subterranean formation penetrated by an injection well which comprises the steps of injecting into said formation through said injection well:
  (a) a first surfactant solution containing a surfactant capable of forming a tenacious foam under formation conditions when intimately contacted by gas,
  (b) an amount of gas sufficient in quantity to substantially completely foam said first surfactant solution,
  (c) a second dilute surfactant solution immediately following said gas in an amount sufficient to form a buffer zone between the foam and a subsequently injected aqueous fracturing fluid whereby said foam substantially maintains its integrity, and
  (d) an aqueous fracturing fluid immediately following said second dilute surfactant solution in an amount and under a pressure sufficient to cause fracturing of said formation.

15. The method of acidizing a subterranean formation penetrated by an injection well which comprises the steps of injecting into said formation through said injection well:
(a) a first surfactant solution containing a surfactant capable of forming a tenacious foam under formation conditions when intimately contacted by gas,
(b) an amount of gas sufficient in quantity to substantially completely foam said first surfactant solution,
(c) a second dilute surfactant solution immediately following said gas in an amount sufficient to form a buffer zone between the foam and a subsequently injected aqueous driving fluid,
(d) an aqueous driving fluid immediately following said second dilute surfactant solution in an amount sufficient to drive said foam and dilute surfactant solution through at least a portion of the formation to be acidized, and
(e) an amount of acidic fluid sufficient to treat at least that portion of the formation adjacent the injection well bore.

References Cited

UNITED STATES PATENTS

| | | |
|---|---|---|
| 2,053,285 | 9/1936 | Grebe. |
| 2,866,507 | 12/1958 | Bond et al. _____ 166—9 |
| 3,047,066 | 7/1962 | Mosely _____ 166—32 |
| 3,136,361 | 6/1964 | Marx _____ 166—42.1 |
| 3,177,939 | 4/1965 | Holm et al. _____ 166—9 |
| 3,185,634 | 5/1965 | Craig et al. _____ 166—9 |
| 3,196,944 | 7/1965 | Bernard et al. _____ 166—9 |
| 3,207,217 | 9/1965 | Woertz _____ 166—9 |

OTHER REFERENCES

Bernard, George G.: Effect of Foam on Recovery of Oil by Gas-Oil Drive, in Producers Monthly, 27(1), January 1963, pp. 18–21.

Bernard, George G., et al.: Effect of Foam on Permeability of Porous Media to Gas, in J. Soc. Petroleum Engineers, 4(3), September 1964, pp. 267–274.

CHARLES E. O'CONNELL, *Primary Examiner.*

I. A. CALVERT, *Assistant Examiner.*